United States Patent
Kapadia et al.

(10) Patent No.: US 11,075,803 B1
(45) Date of Patent: Jul. 27, 2021

(54) STAGING CONFIGURATION CHANGES WITH DEPLOYMENT FREEZE OPTIONS

(71) Applicant: Cisco Technology, Inc., San Jose, CA (US)

(72) Inventors: Shyam Kapadia, San Jose, CA (US); Lukas Krattiger, Pleasanton, CA (US); Jason David Notari, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/937,162

(22) Filed: Jul. 23, 2020

Related U.S. Application Data

(60) Provisional application No. 63/033,633, filed on Jun. 2, 2020.

(51) Int. Cl.
*G06F 15/173* (2006.01)
*H04L 12/24* (2006.01)
*H04L 29/06* (2006.01)

(52) U.S. Cl.
CPC ........ *H04L 41/0813* (2013.01); *H04L 63/105* (2013.01)

(58) Field of Classification Search
CPC .......................... H04L 41/0813; H04L 63/105
USPC ................. 709/220, 221, 222, 223
See application file for complete search history.

(56) References Cited

U.S. PATENT DOCUMENTS

| 10,587,479 | B2 * | 3/2020 | Shakimov | H04L 41/0873 |
| 2014/0082514 | A1 * | 3/2014 | Sivaraman | H04M 1/72454 715/745 |
| 2016/0085641 | A1 * | 3/2016 | Nagasubramaniam | H04L 41/0654 714/4.11 |
| 2017/0163493 | A1 * | 6/2017 | AuYoung | H04L 12/6418 |
| 2020/0294353 | A1 * | 9/2020 | Narra | G07F 17/3241 |

* cited by examiner

*Primary Examiner* — Liang Che A Wang
(74) *Attorney, Agent, or Firm* — Lee & Hayes, P.C.

(57) ABSTRACT

Techniques for a configuration change service to transition a network controller into a frozen state, causing network users submitting configuration changes associated with the network to refrain from deploying the configuration changes for a period of time are disclosed. A first user configured as a stager role may submit data representing a proposed change to the configuration change service, where the proposed change may be stored in association with a list of proposed changes. A second user configured as an approver role may submit data representing an approval or disapproval of the proposed changes to the configuration change service, where a modified list of proposed changes may be generated. A third user configured as an administrator role may submit data configured to transition the controller to an unfrozen state and/or deploy the changes included in the list of proposed changes to the network controller, subsequent to the period of time.

20 Claims, 9 Drawing Sheets

Change Management

600 →

| | Change ID | Trouble Ticket | State | Updated | Description | User | Change |
|---|---|---|---|---|---|---|---|
| ☑ | 0 | 6823AB... | Comp... | 1 week... | Change made to update interfaces | User #1 | View |
| ☐ | 1 | 6823AB... | Comp... | 1 week... | Change made to update interfaces | User #1 | View |
| ☐ | 2 | 6823AB... | Comp... | 1 week... | Change made to update interfaces | User #1 | View |
| ☐ | 3 | 6823AB... | Comp... | 1 week... | Change made to update interfaces | User #1 | View |
| ☐ | 4 | 6823AB... | Comp... | 1 week... | Change made to update interfaces | User #1 | View |
| ☐ | 5 | 6823AB... | Comp... | 1 week... | Change made to update interfaces | User #1 | View |
| ☐ | 6 | 6823AB... | Comp... | 1 week... | Change made to update interfaces | User #1 | View |
| ☐ | 7 | 6823AB... | Comp... | 1 week... | Change made to update interfaces | User #1 | View |
| ☐ | 8 | 6823AB... | Comp... | 1 week... | Change made to update interfaces | User #1 | View |
| ☐ | 9 | 6823AB... | Comp... | 1 week... | Change made to update interfaces | User #1 | View |

Toolbar: Add, Delete, Set Mode, Submit, Approve, Deploy — 606; Selected 1 items — 604; 602

< 1 2 3 4 5 >

Config Deployment for Change 0; 6823ABVC2310 608 ✕

Step 1. Configuration Preview > Step 2. Configuration Deployment Status >

| Switch Name | IP Address | Switch Serial | Preview Config | Status | Re-sync | Progress |
|---|---|---|---|---|---|---|
| Spine-84 | 172.13.242.84 | SAL1845ASM | 713 lines | Approved | ⟳ | 100% |
| Leaf-91 | 172.13.242.91 | SAL1925CRL | 208 lines | Approved | ⟳ | 100% |
| Spine-83 | 172.13.242.83 | SAL1845AWH | 37 lines | Out-of-sync | ⟳ | 100% |
| BG-96 | 172.12.37.96 | FD02131WXN | 64 lines | Approved | ⟳ | 100% |
| Leaf-82 | 172.13.242.82 | SAL1845AX3 | 385 lines | Out-of-sync | ⟳ | 100% |

610

Select Report Template: DEFAULT_ISSU_PRE_POST ▼ — 612

Deploy Config 614

FIG. 6

STAGING CONFIGURATION CHANGES WITH DEPLOYMENT FREEZE OPTIONS

RELATED APPLICATIONS

This application claims priority to U.S. Provisional Patent Application No. 63/033,633, filed on Jun. 2, 2020, the entire contents of which are incorporated herein by reference.

TECHNICAL FIELD

The present disclosure relates generally to queuing configuration change submissions for at least a portion of a network associated with a network controller in a frozen state to allow for review and approval of the proposed changes and deployment of the configuration changes during a desired time period, such as a maintenance window.

BACKGROUND

Service providers offer computing-based services, or solutions, to provide users with access to computing resources to fulfill users' computing resource needs without having to invest in and maintain computing infrastructure required to implement the services. These service providers often maintain networks of data centers which house servers, routers, and other devices that provide computing resources to users such as compute resources, networking resources, storage resources, database resources, application resources, and so forth. The solutions offered by service providers may include a wide range of services that may be fine-tuned to meet a user's needs. Users may be allocated portions of computing resources across a number of networks using virtualization technology to support such solutions. Additionally, these computing resources may rely substantially on alterations to the network which may become complex when multiple users deploy varying configuration changes without being aware of one another.

To make configuration changes to the network and/or devices of a network, a user may be required to deploy configuration changes to a network controller where the changes are propagated to devices through network communications. When multiple users deploy configuration changes to the network controller without awareness of each respective change, various issues may arise. For example, the network controller may receive changes during critical hours of operation for the network, conflicting and/or contradicting changes, changes that have not been fully tested and may result in failures within the network, and/or changes from a user that is unauthorized to change the configuration of the controller, thus resulting in a less desirable user experience with the network.

To effectively update a configuration of a network and/or devices of a network associated with a network controller, the current state of the configuration of the controller must be captured and understood by a user submitting a proposed configuration change. Additionally, a user should be aware of other proposed configuration changes that have been submitted by other users, such that the proposed changes do not contradict and/or conflict with one another. While there may be collaborative tools offered to users to facilitate group efforts, these collaborative tools often lack the ability to monitor, control, and track specific users collaborating together, generally require excessive communications, and do not remove the potential for improper deployment of configuration changes.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 6 illustrates a schematic diagram of an example user interface configured to receive data representing deployment of a configuration change from a user and to present data associated with the configuration change to the user.

DESCRIPTION OF EXAMPLE EMBODIMENTS

Overview

Figure 1:
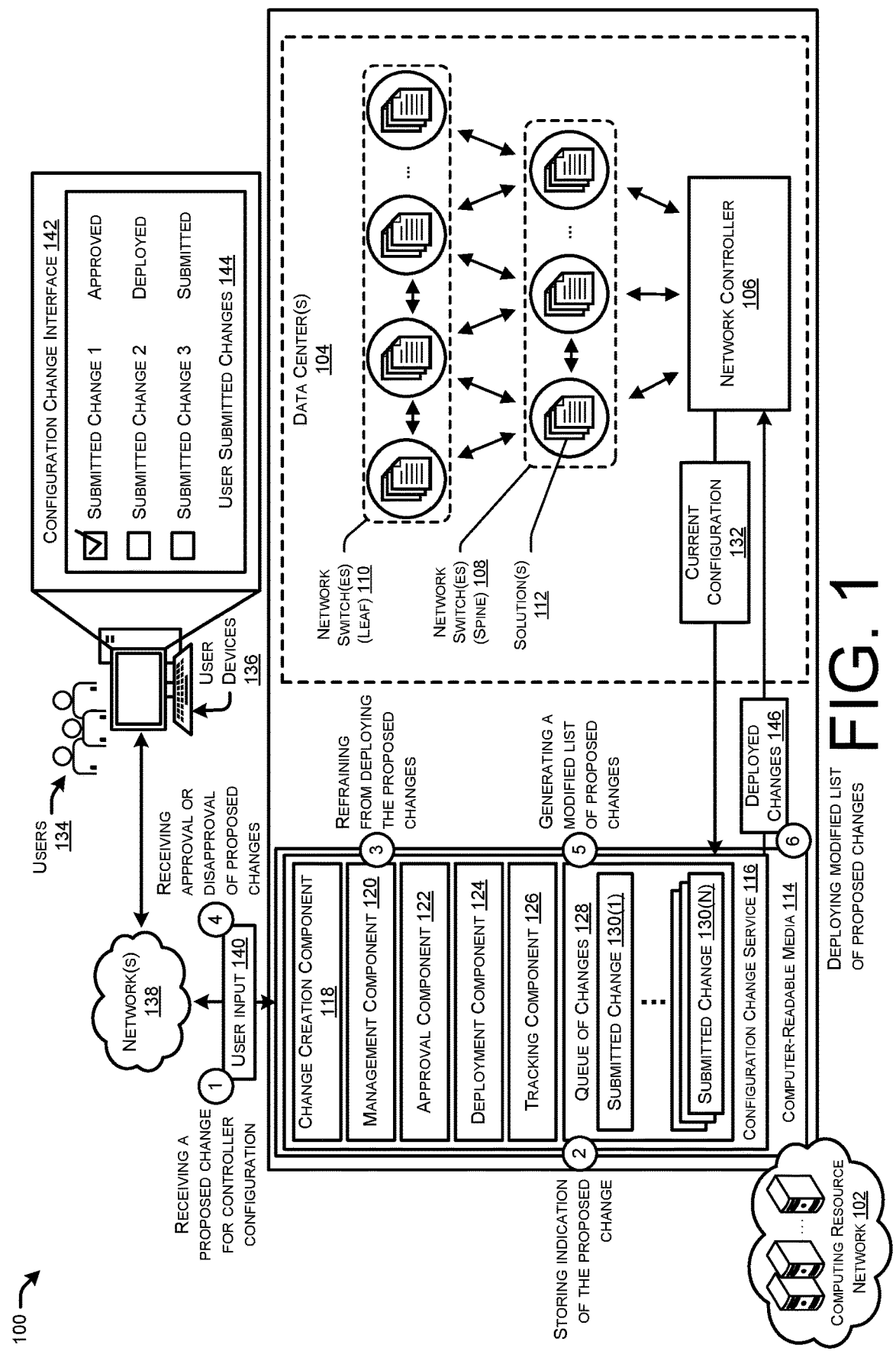
FIG. 1 illustrates a system-architecture diagram of an example flow for utilizing a computing resource network to stage proposed configuration changes for a network in a frozen state from a first user and queuing the change with additional proposed configuration changes to receive approval or disapproval of the proposed changes from a second user and generate a modified list of the proposed configuration changes to deploy once the network controller is transitioned to an unfrozen state.

This disclosure describes a method of maintaining a queue of user submitted configuration changes for a network and/or network devices associated with a network controller for a period of time when changes are not being deployed, receiving approval or disapproval of the proposed changes, generating a modified list of the proposed configuration changes and deploying the modified list of proposed configuration changes subsequent to the period of time. The method includes receiving first data representing a proposed change for a current configuration of a Software-Defined-Networking (SDN) Controller. The method may further include storing an indication of the proposed change in association with a list of proposed changes for the configuration of the SDN controller. The method may further include refraining from deploying the proposed changes in the list of proposed changes for a period of time. The method may further include receiving second data representing an approval or disapproval of at least one of the proposed changes in the list of proposed changes. The method may further include generating a modified list of proposed changes. The modified list of proposed changes may be generated based at least in part on the second data. The method may further include deploying the proposed changes in the modified list of proposed changes to the SDN controller such that the current configuration is changed to an updated configuration. The deploying the proposed changes in the modified list may be subsequent to the period of time.

Additionally, the techniques described herein may be performed by a system and/or device having non-transitory computer-readable media storing computer-executable instructions that, when executed by one or more processors, performs the method described above.

Example Embodiments

The usefulness of server virtualization, from virtual machines to containers to storage, has resulted in a rapid increase in cloud computing and data centers. Automation of data center networks have become crucial for building and managing a data center network, and a network controller may be required to provide provisioning, management, and/or monitoring for the entire infrastructure of the data center network. Deployment of these networks may comprise of multiple network sites that may span across different geographical regions and boundaries. Automated interconnectivity of such data centers has become an expectation of users, presenting a challenge that each site may have a different network administrator user, differing operational staff roles, and/or respective network change rules and regulations.

Many data centers utilize segregation of user roles, such as, for example, network administrators (super-user) and/or network operators (read-only user). Additionally, many network controllers may provide abilities to create custom roles that in turn have permissions, or role-based access control (RBAC) access to certain granularity. These custom roles may come with permissions granting a user the ability to make a change to a configuration of the network controller. However, access is generally controlled at the absolute read or write level, thus, every change that is made to the configuration is considered to be allowed and is directly deployed to the network infrastructure. While this behavior by the network controller may be desired in some scenarios, there is a demand for a layered approach where actions associated with changing the configuration, such as, for example, staging changes, validating changes, approving changes, and/or deploying changes need to be separated.

Typically, a change ticket may be created, where the state of the infrastructure, both before and after the change, as well as the proposed configuration change, are logged. A supervisor user can then approve or deny the configuration change, and when approved, an administrator of the network can deploy the configuration changes atomically to the infrastructure of the network with the ability to rollback the changes in the event of an update failure or network crash. However, even utilizing prior changes techniques, there is no functionality allowing for staging capabilities at the network controller, such as, for example, where the changes to the configuration may be prepared with a full historical accounting of the changes to the configuration. Such functionality may allow for the configuration changes to be reviewed for approval and deployment during a desired period of time. Additionally, there is a need to prevent inadvertent deployment changes to the network controller, regardless of a user's privilege level and/or user role.

This disclosure describes techniques for a configuration change service capable of transitioning a network controller and/or a portion of the network associated with the network controller into a frozen state to allow for a period of time to receive configuration change submissions from multiple users, where the change submissions may be staged, or queued for review and approval or denial, and the approved changes may then be deployed to the configuration of the network controller subsequent to the period of time and/or user action to transition the controller into an unfrozen state. Additionally, the configuration change service may be configured to track and record a history of each individual change, the user responsible for creating the change, and the reasoning for the submission of the change. If a portion of the network is in the frozen state, even network administrators may be unable to deploy configuration changes to network devices in this portion of the network. Further, the configuration change service may include user roles with certain permissions, such as, for example, a stager role, an approver role, and/or an admin, or a deployer role. The techniques described herein include freezing the state of at least a portion of the network for a period of time, segmenting the process of applying user-submitted changes to a network controller configuration by user role, and deploying a user-approved modified list of configuration changes to the network controller subsequent to the period of time and/or subsequent to the portion of the network transitioning to an unfrozen state.

The configuration change service may be accessible via a number of user interfaces (UIs) presented to users associated with the network. Additionally, or alternatively, the configuration change service may be configured to receive data representing user input for modifying a configuration of the network controller via the UIs.

In some examples, the UIs may present data indicating an identification number associated with a change record, a ticket number associated with the change record, a state of the change record, a change record history including when the change record was last updated, a description of the change record, an identifier of a user account that created the change record, and/or a summary of the change record. In some examples, the change record history may include indications of user account actions associated with the change record, such as, for example, creating a new change record, modifying a change record, approval of a change record, and/or deployment of a change record. In some examples, the change record history may include the identifier of the user account that performed the action on the change record and/or an indication of when the action was performed on the change record. Additionally, or alternatively, the summary of the change record may include an indication of the network devices associated with the change record and/or technical details associated with the change record. In some examples, the UIs may present data indicating name(s) of network device(s) associated with the change record, an Internet Protocol (IP) address(es) of the network device(s) associated with the change record, a serial number of the network device(s) associated with the change record, a synchronization status of the network device(s) associated with the change record, a progression of the deployment of the change record to the network device(s), and/or an actionable element to re-synchronize the network device(s) associated with the change record.

Additionally, or alternatively, the UIs may include actionable elements configured to perform actions on the change record, such as, for example, add a change record, delete a change record, preview, or validate, a change record, submit a change record, approve a change record, deny a change record, and/or deploy a change record. In some examples, the configuration change service may be accessible via user accounts, each user account may include an associated user role providing users with varying levels of privileges for modifying the configuration of a network controller associated with the network and/or actuating the actionable elements of the UIs. For example, the user roles may include a stager role, an approver role, and/or an administrator role. In some examples, the UIs may include UIs configured to present information for the individual user roles.

The stager role may be configured such that a user account accessing the configuration change service with an associated stager role may include privileges allowing for the user account to create a change record for making and submitting changes to the network and/or network devices of the network. For example, a user account configured as the stager role may include privileges allowing for the user account to create and save changes to the change record, including changes to various elements of the network, such as, for example, templates, policies, interfaces, network underlay, network overlay. Additionally, or alternatively, a user account configured as the stager role may include privileges that do not allow the user account to approve and/or deploy the change record to the network controller. In some examples, the stager role may be configured such that multiple user accounts that are configured as the stager role may submit simultaneous change records to the configuration of the controller. Additionally, or alternatively, the changes made by a user account configured as the stager role may be individually tracked, such that, each change made to a change record is mapped to the user account that submitted the change, including a justification, or reasoning, provided by the user account, as to why the change is proposed.

Once a user account configured as a stager role is satisfied with the changes in the change record, the change record may be previewed such that the user account can validate the change prior to submission of the change record. In some examples, when a user account configured as a stager role submits a change and/or change record, the change record may be optionally marked as a proposed change record awaiting approval and/or sent to a user account configured as the approver role where the change record may be approved or denied. In some examples, when a change record has been submitted, an associated policy template instance associated with the submitted change record may be created. Additionally, or alternatively, a submitted change record may be placed in a queue of proposed changes, where the proposed changes may be queued for approval or denial by a user account configured as an approver role.

The approver role may be configured such that a user account accessing the configuration change service with an associated approver role may include privileges allowing for the user account to approve or deny change records including changes submitted by user accounts that are configured as a stager role. Additionally, or alternatively, a user account configured as the approver role may include privileges that do not allow the user account to make, edit, submit, and/or deploy change records to the configuration of the network controller. In some examples, the approver role may be configured such that multiple user accounts that are configured as the approver role may approve or deny change records including the changes to the configuration of the network controller. Additionally, or alternatively, the changes included in a change record that are approved or denied by a user account configured as the approver role may be individually tracked, such that, the change is mapped to the user account that approved or denied the submitted change, including a justification, or reasoning, provided by the user account, as to why the change record is approved or denied.

In some examples, when a user account configured as the approver role approves a change record, the change record may be marked as an approved change. In some examples, when a change record has been marked as an approved change, the associated policy template instances may be saved. In some examples, a change record that has been marked as an approved change may be placed in a queue of approved changes where the approved changes may be queued for deployment to the network controller by a user account configured as an administrator role. Additionally, or alternatively, when a user account configured as the approver role denies a change record, the change record may be marked as denied change. In some examples, when a change record has been marked as a denied change, the change record may be canceled, and the associated policy template instances may be deleted. Additionally, or alternatively, when a change record has been marked a denied change, the change record may be returned and/or marked requesting additional changes and/or edits to the changes included in the change record by a user account configured as the stager role.

The administrator role may be configured such that a user account accessing the configuration change service with an associated administrator role may include privileges allowing for the user account to deploy the change records that have been approved by user accounts that are configured as an approver role. Additionally, or alternatively, a user account configured as an administrator role may include privileges that include privileges allowing for the user account to alter the state of the network controller and/or a portion of the network associated with the network controller. For example, a user account configured as the administrator role may transition the network controller and/or a portion of the network associated with the network controller into the frozen state, the unfrozen state, and/or the partially unfrozen state. Additionally, or alternatively, a user account configured as an administrator role may include privileges that include the privileges associated with the stager role and/or the approver role, such that a user account configured as an administrator role may perform any of the actions described with respect to the stager role and/or the approver role. In some examples, the administrator role may be configured such that multiple user accounts that are configured as the administrator role may deploy change records including the changes to the configuration of the network controller. Additionally, or alternatively, the changes included in a change record that are deployed by a user account configured as the administrator role may be individually tracked, such that, the change is mapped to the user account that approved or denied the submitted change, including a justification, or reasoning, provided by the user account, as to why the change record is deployed.

In some examples, when a user account configured as the administrator role may review and re-approve a change record that may have been previously approved by the approver role and included in the approved changes. In some examples, when a user account configured as the administrator role denies a change record, the change record may be marked as a denied change. In some examples, when a change record has been marked as a denied change, the change record may be canceled, and the associated policy template instances may be deleted. Additionally, or alternatively, when a change record has been marked a denied change, the change record may be returned and/or marked requesting additional changes and/or edits to the changes included in the change record by a user account configured as the stager role. Additionally, or alternatively, when a user account configured as the administrator role deploys a change record, the changes included in the change record may be deployed to the network controller such that the current configuration of the network controller is changed to an updated configuration of the network controller. Additionally, or alternatively, the current configuration of the network controller may be captured and changed to the updated configuration of the network controller, and then the updated configuration may be deployed to the network controller where the current configuration may be replaced by the updated configuration. In some examples, the administrator role may deploy individual change records in a queue of approved changes. Additionally, or alternatively, the administrator role may deploy the entire queue of approved changes. In some examples, when a change record has been deployed, the associated policy template instances may be saved.

The network controller may be configured as a Software-Defined-Networking (SDN) controller. In some examples, the SDN controller of a cloud computing network may be configured to control network devices and distribute network updates throughout the cloud computing network. The SDN controller may be configured to function in multiple states, such as an unfrozen state, a frozen state, and/or a partially frozen state. In some examples, the unfrozen state may be configured such that the SDN controller may receive configuration changes deployed by a user account configured as an administrator role that is associated with the network and apply the changes to the current configuration of the SDN controller while in the unfrozen state. Additionally, or alternatively, the frozen state may be configured such that the SDN controller may not receive configuration changes and/or may not allow a user account configured as the administrator role to deploy the changes until the state is transitioned to the unfrozen state. Additionally, or alternatively, the partially frozen state may be configured such that the SDN controller may treat a first portion of the network as if it is in the frozen state and a second portion of the network as if it is in the unfrozen state. For example, the partially frozen state may be configured to not receive configuration changes and/or may not allow a user account configured as the administrator role to deploy the changes that are associated with the first portion of the network, and may receive configuration changes that are associated with the second portion of the network and deployed by a user account configured as the administrator role.

In some examples, a first user account configured as a stager role may create a new change record including one or more changes associated with the network and/or network devices associated with the network. In some examples, the first user account may modify the change record, such as, for example, adding changes to the change record, editing changes in the change record, and/or deleting changes in the change record. For example, the first user account may add a first change to the change record. Additionally, or alternatively, one or more additional user accounts configured as a stager role may modify the change record, such as, for example, adding changes to the change record, editing changes in the change record, and/or deleting changes in the change record. In some examples, once the first user has finished modifying the change record, the first user may preview the change record. Additionally, or alternatively, once the first user has finished modifying the change record and/or previewing the change record, the first user may submit the change record for approval.

In some examples, a second user account configured as an approver role may approve or deny the change record. For example, the second user account may approve the change record including the first change. Additionally, or alternatively, the second user may deny the change record including the first change. In some examples, when the change record is denied, the change record is canceled. Additionally, or alternatively, the second user may request that the first user add additional changes to the change record, edit the first change, and/or delete one or more changes from the change record, and re-submit the change record for approval. Additionally, or alternatively, one or more additional user accounts configured as an approver role may approve or deny the change record.

In some examples, a third user account configured as an administrator role may re-approve, deny, and/or deploy the change record. For example, the third user account may approve the change record, including the first change, that was previous approved by the second user account. Additionally, or alternatively, the third user account may deny the change record, including the first change, that was previously approved by the second user account. In some examples, when the change record is denied, the change record is canceled. Additionally, or alternatively, the third user may request that the first user add additional changes to the change record, edit the first change, and/or delete one or more changes from the change record, and re-submit the change record for approval. Additionally, or alternatively, the third user account may deploy the change record to the network such that the current configuration of the network controller is changed to an updated configuration, including the first change. Additionally, or alternatively, one or more additional user accounts configured as an administrator role may re-approve, deny, and/or deploy the change record.

As described herein, a computing-based solution can generally include any type of resources implemented by virtualization techniques, such as containers, virtual machines, virtual storage, and so forth. Further, although the techniques described as being implemented in data centers and/or a cloud computing network, the techniques are generally applicable for any network of devices managed by any entity where virtual resources are provisioned. In some instances, the techniques may be performed by a schedulers or orchestrator, and in other examples, various components may be used in a system to perform the techniques described herein. The devices and components by which the techniques are performed herein are a matter of implementation, and the techniques described are not limited to any specific architecture or implementation.

The techniques described herein provide various improvements and efficiencies with respect to receiving proposed changes for a configuration of a network controller from a stager user and, while the network controller is in a frozen state, refraining from deploying the proposed changes for a period of time while the changes are approved and/or denied by an approver user before an administrator user deploys an approved list of the proposed changes to modify the configuration of the network controller once the network controller is transitioned to an unfrozen state. For instance, the techniques described herein may receive input from user accounts configured as a stager role, and approver role, and/or an administrator role. By freezing the network controller for a period of time, a network administrator can ensure that configuration updates are deployed during desired maintenance windows. Additionally, by separating roles of responsibility and tracking change history with respect to user accounts, the configuration change service may allow for improved review and validation of configuration changes and version control of configuration updates.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system architecture diagram 100 of an example flow for utilizing a computing resource network 102 to stage proposed configuration changes for a network in a frozen state from a first user and queuing the change with additional proposed configuration changes to receive approval or disapproval of the proposed changes from a second user and generate a modified list of the proposed configuration changes to deploy once the network controller is transitioned to an unfrozen state. The computing resource network may comprise one or more data centers 104 that include various networking components, such as, a Software-Defined-Networking (SDN) controller 106, spine network switches 108 (also referred to as spine nodes), and leaf network switches 110 (also referred to as leaf nodes) operating on physical servers. In some examples, the computing resource network 102 may be a distributed network through which users (often customers) may interact via user devices to manage or otherwise interact with computing-based services, or solutions 112, provided by the computing resource network 102.

The computing resource network 102 may provide on-demand availability of computing system resources of physical server(s), such as data storage, computing power (e.g., CPU, GPU, etc.), networking, databases, etc., without direct active management by users. In some examples, the computing resource network 102 may be managed and maintained by a service provider such that users do not have to invest in and maintain the computing infrastructure for their computing resource needs. Generally, a user may be provided access to, or allocated use of, a portion of the computing resources of physical server(s) in the computing resource network 102. The computing resource network 102 may scale, such as by spinning up resources or spinning down resources, based on demand for the individual users.

The portions of the computing resource network 102 may be allocated using hardware virtualization such that portions of the computing resource network 102 can be configured and managed by the user (e.g., security configuration, load balancing configuration, etc.). However, the computing resource network 102 need not be managed by a service provider, and can be managed by any entity, including the user themselves that run the applications or services.

In some examples, physical server(s) may host one or more virtual machines. Each virtual machine may be configured to execute one of various operations and act as one or more virtual components for the computing resource network 102, such as, for example, computing-based solution 112. In some examples, the physical server(s) may host any number of virtual machines. In some examples, physical server(s) in the cloud computing network 102 may host the various network components of the computing resource network 102, such as, for example, the spine network switch(es) 108 and/or the leaf network switch(es) 110.

In some examples, the computing resource network 102 may comprise computer-readable-media 114. In some examples, the computer-readable media 114 may include a configuration change service 116 disposed in the computing resource network 102. The configuration change service 116 may include a change creation component 118, a management component 120, an approval component 122, a deployment component 124, a tracking component 126, and/or have access to a queue of changes 128 including one or more submitted change(s) 130(1)-(N). In some examples, the network controller 106 may provide an indication of its current configuration 132 to the configuration change service 116.

The configuration change service 116 may be accessible to a user 134 to interact directly with the configuration change service 116. The user(s) 134 may comprise one or more of individual users, groups of users, organizations, businesses, or other entities that interact with the computing resource network 102 via respective user devices 136. The user devices 136 may be any type of computing device capable of connecting to the computing resource network 102 via the data communications network 138 such as, but not limited to, a laptop or desktop computer, a tablet computing device, a server computer, a television, or a mobile telephone.

The users 134 may provide user input 140 via the network(s) 138 to interact with the configuration change service 116. For example, the users 134 may utilize one or more configuration change interface(s) 142, provided by the configuration change service 116, via the one or more user device(s) 136. In some examples, the users 134 may create, manage, approve, and/or deploy one or more user submitted changes 144 via the one or more configuration change interface(s) 142. Additionally, or alternatively, the users 134 may be configured as an administrator role including privileges that allow the user 134 to change the state of the network controller. For example, a user 134 configured as an administrator role may transition the network controller to a frozen state, an unfrozen state, and/or a partially frozen state. For example, a user 134 may deploy one or more user submitted changes 144 from the configuration change service 116 to the network controller 106 such that the deployed changes 146 change the current configuration 132 of the network controller 106 to an updated configuration.

At "1," a configuration change service 116 may receive user input 140 providing first data representing a proposed change 130 for a current configuration 132 of a network controller 106. In some examples, the user input 140 may be received from a first user account configured as a stager role. In some examples, the network controller 106 may be a Software-Defined-Networking (SDN) controller.

At "2," the configuration change service 116 may store an indication of the proposed change 130 in a data store associated with the configuration change service 116. In some examples, the configuration change service 116 may store the indication of the proposed change 130 in association with a list and/or a queue of proposed changes 128 for the configuration of the SDN controller.

At "3," the configuration change service 116 may refrain from deploying the proposed changes 130 in the list and/or queue of proposed changes 128 for a period of time. In some examples, the period of time may be based on a predefined schedule, where the configuration change service 116 may refrain from deploying the proposed changes 130 for a period of time until a scheduled maintenance window. Additionally, or alternatively, the period of time may correspond to a period of time between state transitions of the SDN controller 106. For example, the SDN controller 106 may be in a frozen state, such that, the SDN controller 106 is configured to not receive configuration updates until a user 134 having an administrator role transitions the SDN controller 106 into an unfrozen or partially frozen state.

At "4," the configuration change service 116 may receive user input 140 providing second data representing an approval or disapproval of at least one of the proposed changes 130 in the list and/or queue of proposed changes 128. In some examples, the user input 140 may be received from a first user account configured as an approver role.

At "5," the configuration change service 116 may generate a modified list and/or queue of proposed changes 128. In some examples, the modified list and/or queue of proposed changes 128 may be based at least in part on the second data. For example, the modified list and/or queue of proposed changes 128 may include one or more of the proposed changes 130 that received an approval. Additionally, or alternatively, the modified list and/or queue of proposed changes 128 may not include one or more of the proposed changes 130 that received a disapproval.

At "6," the configuration change service 116 may deploy the proposed changes 130 in the modified list and/or queue of proposed changes 128 such that the current configuration 132 of the SDN controller 106 is changed to an updated configuration. Additionally, or alternatively, the current configuration 132 of the SDN controller 106 may be captured and changed to the updated configuration of the SDN controller 106, and then the updated configuration may be deployed to the SDN controller 132 where the current configuration may be replaced by the updated configuration. In some examples, the proposed changes 130 in the modified list and/or queue of proposed changes 128 may be deployed by a user account configured as an administrator role. In some examples, the administrator role may deploy individual changes 130 in the modified list and/or queue of proposed changes 128. Additionally, or alternatively, the administrator role may deploy the entire modified list and/or queue of proposed changes 128.

Figure 2:
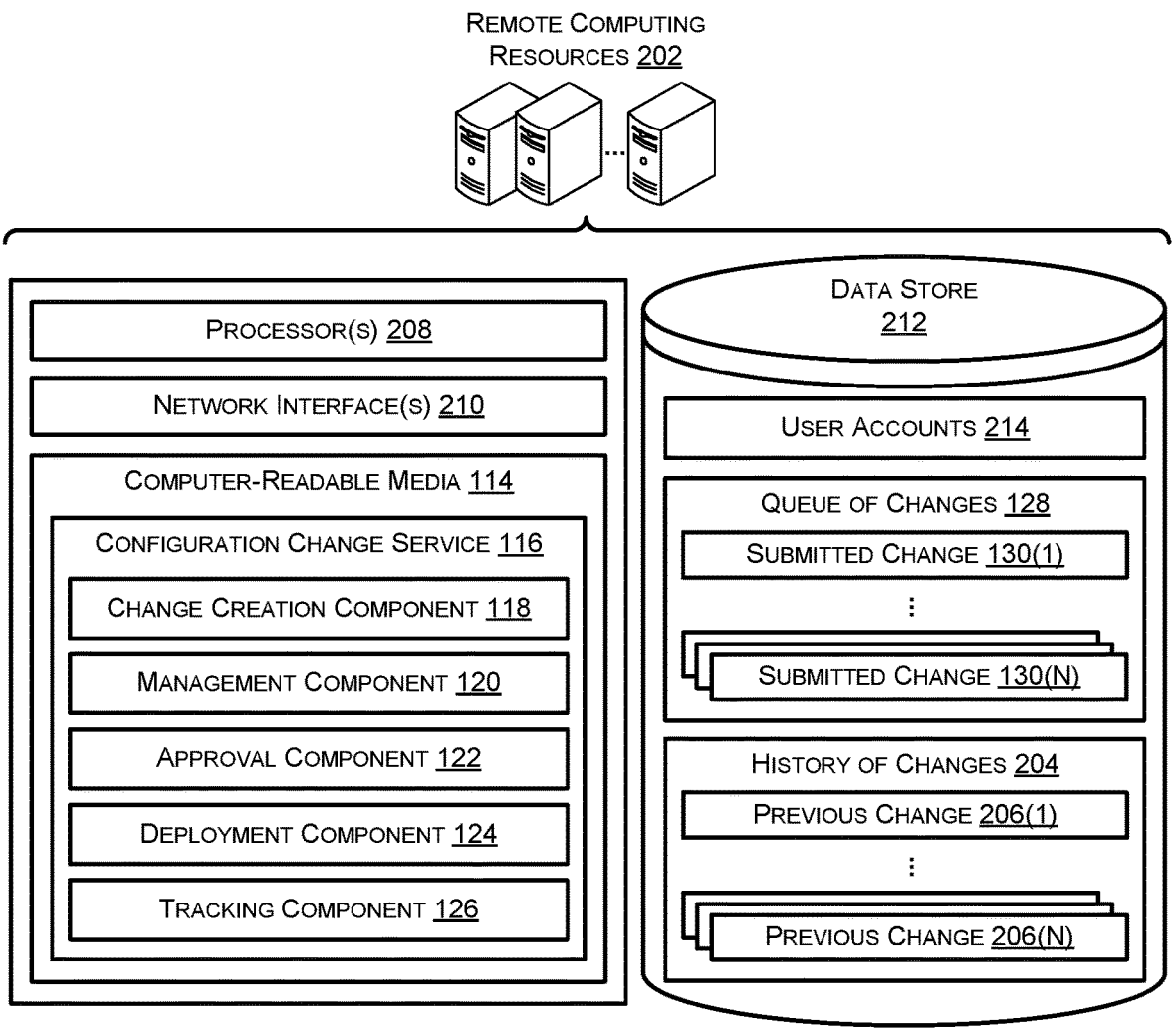
FIG. 2 illustrates a component diagram of example components of remote computing resources that utilize a queue of changes that is populated while the network is in a frozen state and a list representing a history of changes to track and deploy the configuration changes when the network is no longer in the frozen state.

FIG. 2 illustrates a component diagram 200 of example components of remote computing resource(s) 202 of a computing resource network 102 that utilize a queue of changes that is populated while the network controller 106 is in a frozen state and a list representing a history of changes 204 to track previous change(s) 206 and deploy the submitted change(s) 212 when the network controller 106 is no longer in the frozen state.

As illustrated, the remote computing resource(s) 202 may include one or more hardware processors 208 (processors). The processor(s) 208 may comprise one or more cores. Further, the remote computing resource(s) 202 may include one or more network interface(s) 210 configured to provide communications between the computing resource network 102, the data center(s) 104, and other devices, such as a user device 136. The network interfaces 210 may include devices configured to couple to personal area networks (PANs), wired and wireless local area networks (LANs), wired and wireless wide area networks (WANs), and so forth. For example, the network interfaces 210 may include devices compatible with Ethernet, Wi-Fi, and so forth.

The remote computing resources 202 may also include computer-readable media 114 that stores various executable components (e.g., software-based components, firmware-based components, etc.). In addition to various components discussed in FIG. 1, the computer-readable-media 114 may further store components to implement functionality described herein. While not illustrated, the computer-readable media 114 may store one or more operating systems utilized to control the operation of the one or more devices within the computing resource network 102. According to one embodiment, the operating system comprises the LINUX operating system. According to another embodiment, the operating system(s) comprise the WINDOWS SERVER operating system from MICROSOFT Corporation of Redmond, Wash. According to further embodiments, the operating system(s) can comprise the UNIX operating system or one of its variants. It should be appreciated that other operating systems can also be utilized.

Additionally, the remote computing resource(s) 202 may include a data store 212 which may comprise one, or multiple, repositories or other storage locations for persistently storing and managing collections of data such as databases, simple files, binary, and/or any other data. The data store 212 may include one or more storage locations that may be managed by one or more database management systems.

The computer-readable media 114 may further store the configuration change service 116. In some examples, the configuration change service 116 may be configured to receive user input, from user accounts 214 configured as an administrator role, representing a state change to a network controller. For example, the configuration change service 116 may receive user input representing a request to transition the network controller into a frozen state configured to block configuration changes from being deployed while in the frozen state, an unfrozen state configured to allow configuration changes to be deployed while in the unfrozen state, and/or a partially frozen state configured to allow configuration changes to be deployed to an unfrozen portion of the network and to block configuration changes from being deployed to frozen portion of the network. In some examples, the computer-readable media 114 may further store one or more components utilized by the configuration change service 116, such as, for example, a change creation component 118, a management component 120, an approval component 122, a deployment component 124, and/or a tracking component 126.

In some examples, the change creation component 118 may be configured to receive user input representing a proposed change for a current configuration of a network controller. In some examples, the change creation component 118 may be configured to only accept user input from user accounts 214 configured as a stager role and/or an administrator role. The change creation component 118 may be configured to create a change record for making and submitting changes to the network and/or network devices of the network. In some examples, the change creation component 118 may be configured to access and/or modify the queue of changes 128 to add newly submitted change(s) 130 to the queue.

In some examples, the management component 120 may be configured to receive user input representing a request to manage a change record and/or a proposed change for a current configuration of a network controller. In some examples, the management component 120 may be configured to only accept user input from user accounts 214 configured as a stager role and/or and administrator role. The management component 120 may be configured to manage the change record by perform various actions associated with a change record, such as, for example, adding a change to a change record and/or the queue of changes 128, editing a change in the change record, previewing and/or validating a change in the change record, and/or removing a change from the change record. The management component 124 may further be configured to submit the change record and/or proposed changes as a queue of changes 128 including submitted changes 130 for review by user accounts 214 utilizing the approval component 122.

In some examples, the approval component 122 may be configured to receive user input representing an approval or disapproval of a change record and/or a proposed change for a current configuration of a network controller. In some examples, the approval component 122 may be configured to only accept user input from user accounts 214 configured as an approval role and/or administrator role. The approval component 122 may be configured to approve or disapprove a change associated with the change record. In some examples, the approval component 122 may generate a modified queue of changes 128 based on the approval or disapproval of the changes associated with the change record. For example, the approval component 122 may generate a modified queue of changes 128 including one or more submitted changes 130 that have received approval from a user account 214 configured as an approver and/or administrator role. In some examples, the approval component 122 may transmit the modified queue of changes 128 to the deployment component for deployment by user accounts 214 utilizing the deployment component.

In some examples, the deployment component 124 may be configured to receive user input representing a deployment of an approved change record, the modified queue of changes 128, and/or an approved submitted change 130. In some examples, the deployment component 124 may be configured to only accept user input from user accounts 214 configured as an administrator role. The deployment component 124 may be configured to deploy a change associated with the change record. In some examples, the deployment component 124 may deploy the approved change record, modified queue of changes 128, and/or an approved submitted change 130 to the network controller such that the current configuration of the network controller is changed to an updated configuration.

In some examples, the tracking component 126 may be configured to generate a history of changes 204 including one or more previous change(s) 206. In some examples, the tracking component 126 may generate a list representing a history of changes 204 that may include each submitted change 130 that is submitted for approval. In some examples, the tracking component 126 may track and record a history of individual submitted change(s) 130, the user account 214 responsible for creating, modifying, approving, and/or deploying the submitted change 130, and the reasoning for the submission of the submitted change 130. Additionally, or alternatively, the tracking component 126 may track a date and a corresponding action associated with a previous change 206. For example, the tracking component 126 may be configured to query the history of changes 204 to determine a user account 214 that performed an action (created a change, modified a change, deleted a change, approved a change, disapproved a change, and/or deployed a change) associated with a previous change 206 on a date, why the user account 214 performed the action, and what was included in the change.

To utilize the services provided by the computing resource network 102, such as, for example, the change configuration service 116, users may register for an account with the computing resource network 102. For instance, users may utilize a user device to interact with the configuration change service 116 allowing the users to create user accounts 214 with the computing resource network 102. Generally, the configuration change service 116 may enable the users to create, manage, approve, deploy, and/or track configuration changes.

The computer-readable media 114 may be used to store and retrieve information, such as program modules, data structures, or other data. It should be appreciated by those skilled in the art that computer-readable storage media is any available media that provides for the non-transitory storage of data and that can be accessed by the remote computing resources 202 in the computing resource network 102. In some examples, the operations performed by the computing resource network 102, and or any components included therein, may be supported by one or more server devices. Stated otherwise, some or all of the operations performed by the computing resource network 102, and or any components included therein, may be performed by one or more computer devices operating in a cloud-based arrangement.

By way of example, and not limitation, computer-readable storage media 114 can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

Figure 3:
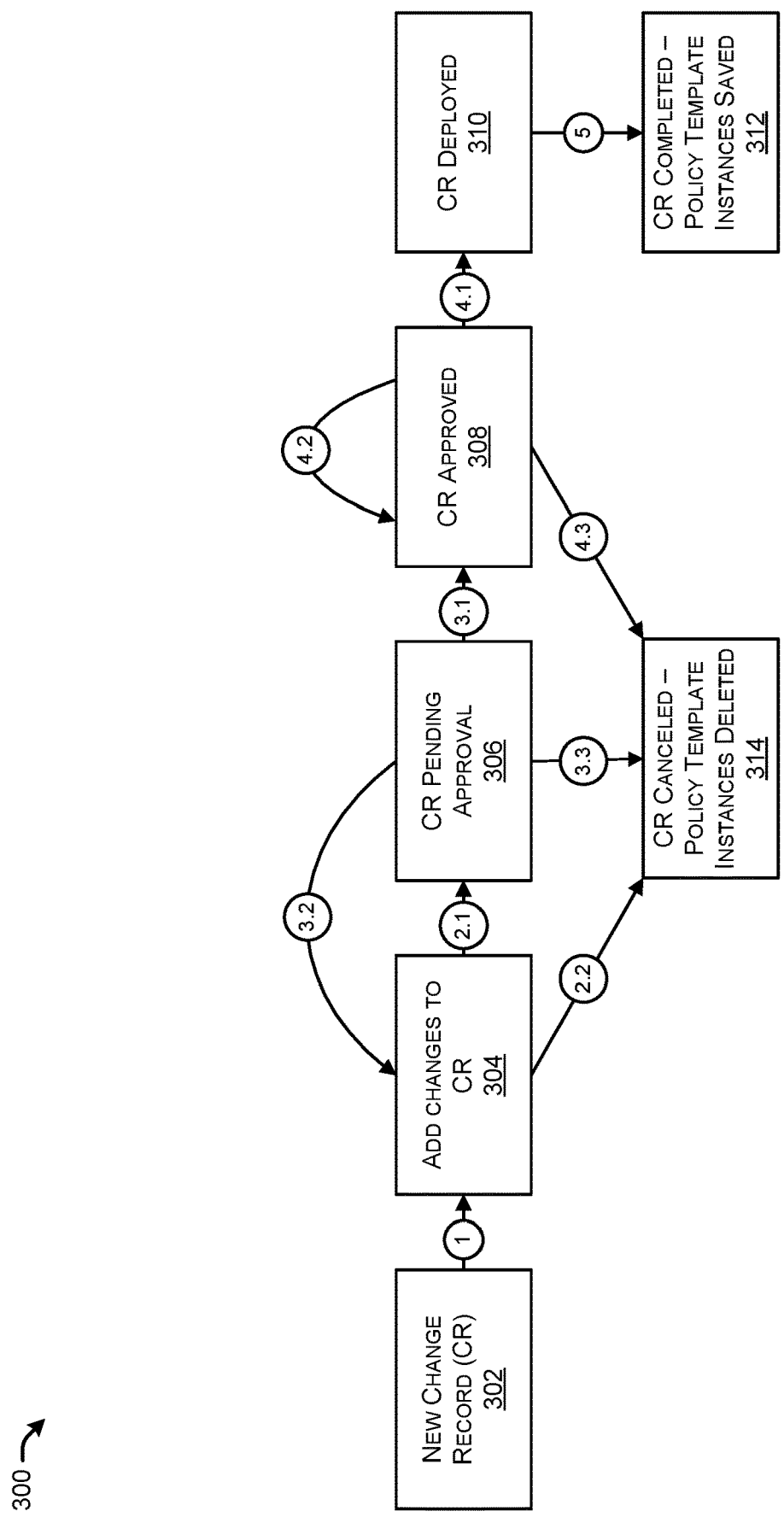
FIG. 3 illustrates an example flow diagram of the lifecycle of a proposed configuration change.

FIG. 3 illustrates an example flow diagram 300 of the lifecycle of a proposed configuration change received from a user utilizing the configuration change service.

At 302, a first user account configured as a stager role may create a new change record including one or more changes associated with the network and/or network devices associated with the network. In some examples, when a new change record is created, a policy template instance associated with the change record may be created.

At 304, the first user account and/or additional user accounts configured as the stager role may modify the change record, such as, for example, adding changes to the change record, editing changes in the change record, and/or deleting changes in the change record. For example, the first user account may add a first change to the change record. Additionally, or alternatively, one or more additional user accounts configured as a stager role may modify the change record, such as, for example, adding changes to the change record, editing changes in the change record, and/or deleting changes in the change record. In some examples, once the first user has finished modifying the change record, the first user may preview the change record. Additionally, or alternatively, once the first user has finished modifying the change record and/or previewing the change record, the first user may submit the change record for approval, following arrow "2.1" to step 306 in the lifecycle. Additionally, or alternatively, the first user may cancel the change record, following arrow "2.2" to step 308 in the lifecycle.

At 306, a second user account configured as an approver role may approve or deny the change record. Additionally, or alternatively, one or more additional user accounts configured as an approver role may approve or deny the change record. For example, the second user account may approve the change record including the first change, where the change record is added to a queue of additional approved change records that are preparing for deployment, following arrow "3.1" to step 308. Additionally, or alternatively, the second user may deny the change and request that the first user add additional changes to the change record, edit the first change, and/or delete one or more changes from the change record, and re-submit the change record for approval, following arrow "3.2" to step 304. Additionally, or alternatively, the second user account may deny the change record and cancel first change, following arrow "3.3" to step 314.

At 308, a third user account configured as an administrator role may re-approve or deny the change record. Additionally, or alternatively, one or more additional user accounts configured as an administrator role may re-approve or deny the change record. For example, the third user account may approve the change record including the first change without additional review, where the change record remains in the queue of the additional approved change records that are preparing for deployment, following arrow "4.1" to step 310. Additionally, or alternatively, the third user account may review the approved change record and re-approve the change record, where the change record remains in the queue of the additional approved change records, and the history of changes associated with the change record is updated to reflect the re-approval by the third user account, following arrow "4.2" to step 308. Additionally, or alternatively, the third user account may deny the change record and cancel first change, following arrow "4.3" to step 314.

At 310, a third user account configured as an administrator role may deploy the changes included in the change record to the network controller, such that a current configuration of the network controller is changed to an updated configuration. Additionally, or alternatively, one or more additional user accounts configured as an administrator role may deploy the changes included in the change record.

At 312, the change record may be completed, and the change record may be logged in the history of changes including information associated with the change record, such as, for example, indications of the user accounts associated with the change record, the actions the user accounts performed, and/or a time and/or date on which the actions were performed. In some examples, when the changes in the change record are deployed and the change record is completed, the associated policy template instances may be saved.

At 314, the change record may be canceled, and the associated policy template instances may be deleted. In some examples, the change record may be canceled by the first user account configured as the stager role. For example, while the first user account is modifying the change record at step 304, the first user account may delete, or cancel, the change record, following arrow "2.2" to step 314. Additionally, or alternatively, the change record may be canceled by the second user account configured as the approver role. For example, while the second user account is approving or denying the change record at step 306, the second user account may deny, or cancel, the change record, following arrow "3.3" to step 314. Additionally, or alternatively, the change record may be canceled by the third user account configured as the administrator role. For example, while the third user is re-approving or denying the change record at step 308, the third user account may deny, or cancel, the change record, following arrow "4.3" to step 314.

Figure 4:
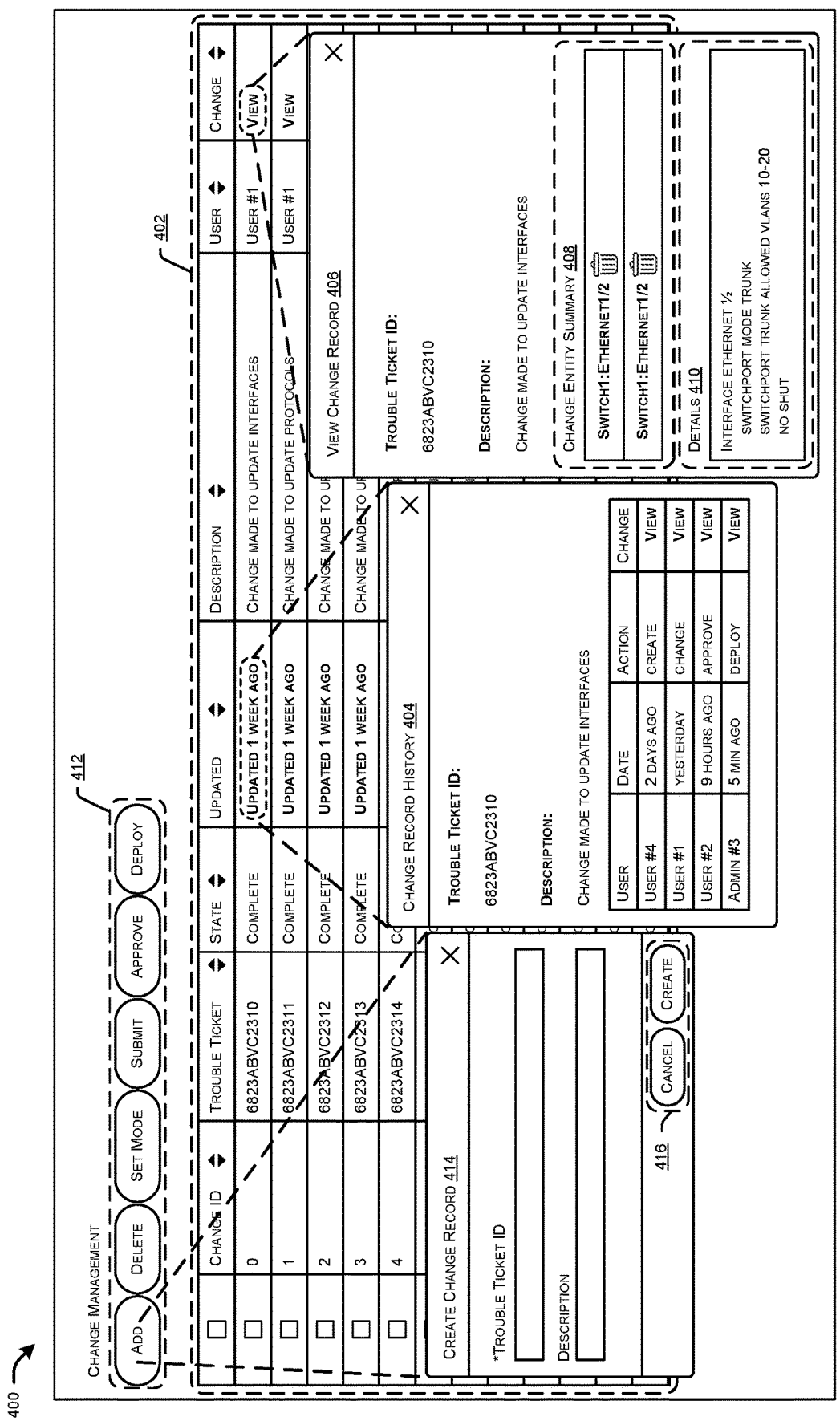
FIG. 4 illustrates a schematic diagram of an example user interface configured to receive data representing a configuration change from a user and to present data associated with the configuration change to the user.
Figure 5:
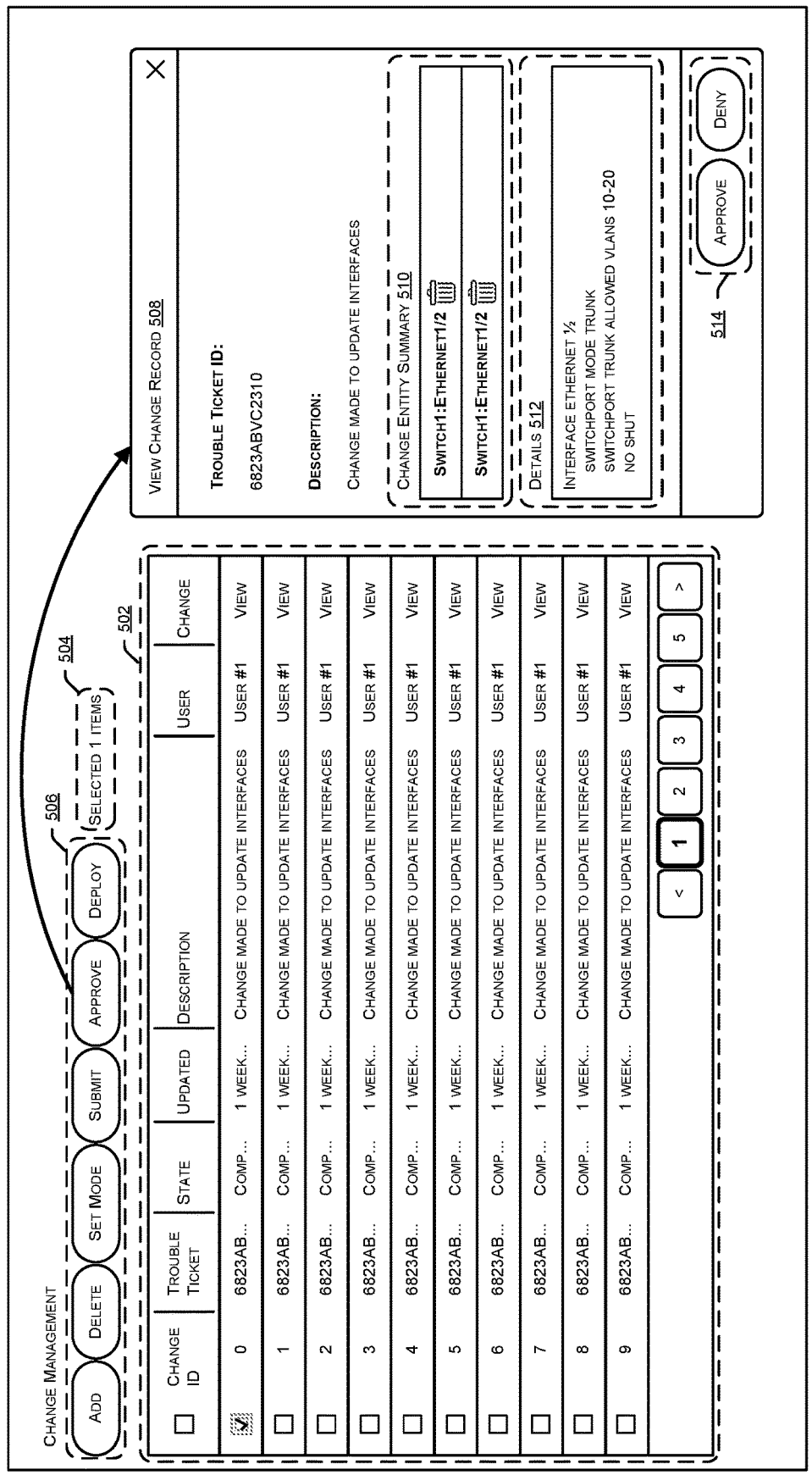
FIG. 5 illustrates a schematic diagram of an example user interface configured to receive data representing an approval or disapproval of a configuration change from a user and to present data associated with the configuration change to the user.

FIGS. 4-6 illustrate various schematic diagrams of example user interface(s) (UIs) 400, 500, and 600 that the configuration change service 116 may cause to be displayed on the user devices 136 accessing the computing resource network 102. The UIs 400, 500, and 600 are included by way of example and not limitation. In some examples, the UIs 400, 500, and 600 may be configured to present data associated with a configuration change to one or more user account(s). Additionally, or alternatively, the UIs 400, 500, and 600 may be configured to receive data associated with a configuration change from one or more user account(s). The UIs 400, 500, and 600 may receive input such as touch input, audio input, and/or any input received from a peripheral device communicatively coupled to the computing device associated with the user account.

FIG. 4 illustrates a schematic diagram of an example user interface 400 configured to receive data representing creation and/or modification of a configuration change from a user account and to present data associated with the configuration change to the user account. In some examples, the user interface 400 may be configured to be utilized by a user account having the stager role.

In some examples, the user interface 400 may include a portion for displaying one or more change records 402 including one or more changes. In some examples, the portion 402 may include one or more columns for presenting information associated with the change record, such as, for example, an identification number associated with a change record, a ticket identifier associated with the change record, a state of the change record, a change record history including when the change record was last updated, a description of the change record, an identifier of a user account that created the change record, and/or a summary of the change record. In some examples, the portion for displaying the one or more change records 402 may include one or more actionable elements for viewing additional portions, such as, for example, a change record history portion 404 and/or a view change record portion 406.

In some examples, the change record history portion 404 may be displayed on the user interface 400 as a result of a user account selecting an entry associated with the change record history. In some examples, the change record history portion 404 may include the ticket identifier associated with the change record, the description of the change record, and/or a history of the change record. In some examples, the history of the change record may include an identifier of the user account performing an action of the change record, the time and/or date associated with the action performed on the change record, an indication of the action performed on the change record, and/or the changes included in the change record.

In some examples, the view change record portion 406 may be displayed on the user interface 400 as a result of a user account selecting an entry associated with viewing the change. In some examples, the view change record portion 406 may include the ticket identifier associated with the change record, the description of the change record, and/or one or more additional portions, such as, for example, a change entity summary portion 408 and/or a details portion 410. In some examples, the change entity summary portion 408 may include an identifier of the network devices associated with the change record and/or one or more actionable elements for removing an associated change from the change record. Additionally, or alternatively, the details portion 410 may include a detailed view of the changes included in the change record. In some examples, the detailed view of the changes may include programming code associated with the changes.

In some examples, the user interface 400 may include one or more actionable elements 412 configured to display one or more additional portions on the user interface 400, such as, for example, a create change record portion 414. In some examples, the one or more actionable elements 506 may include various actionable elements 412 configured to display information on the user interface 400 such as, for example, an "Add" button, a "Delete" button, a "Set Mode" button, a "Submit" button, an "Approve" button, and/or a "Deploy" button. In some examples, the actionable elements 412 may be configured to only receive input from user accounts configured as an associated role. In some examples, the create change record portion 414 may be displayed on the user interface 400 as a result of a user account selecting the "Add" actionable element 412 displayed on the user interface 400.

In some examples, the create change record portion 414 may include one or more fields for accepting user input from one or more user accounts. For example, the create change record portion 414 may include a field configured to receive input representing the ticket identifier associated with the change record and/or the description associated with the change record. Additionally, or alternatively, the create change record portion 414 may include one or more additional actionable elements 416, such as, for example, a cancel button and/or a create button. In some examples, the cancel button 416 may be configured such that, when actuated by a user account, the change record may be canceled. Additionally, or alternatively, the create button 416 may be configured such that, when actuated by a user account, the change record may be created.

FIG. 5 illustrates a schematic diagram of an example user interface 500 configured to receive data representing an approval or disapproval of a configuration change from a user account and to present data associated with the configuration change to the user account. In some examples, the user interface 500 may be configured to be utilized by a user account having the approver role.

In some examples, the user interface 500 may include a portion for displaying one or more change records 502 including one or more changes. In some examples, the portion 502 may include one or more columns for presenting information associated with the change record, such as, for example, an identification number associated with a change record, a ticket identifier associated with the change record, a state of the change record, a change record history including when the change record was last updated, a description of the change record, an identifier of a user account that created the change record, and/or a summary of the change record. In some examples, the portion for displaying the one or more change records 502 may include one or more actionable elements for selecting a change record to perform and action on the selected change record. In some examples, the user interface may include an indication of a number of change records selected 504 and/or an indication of the changes records that are selected 504.

In some examples, the user interface 500 may include one or more actionable elements 506 configured to display one or more additional portions on the user interface 500, such as, for example, a view change record portion 508. In some examples, the one or more actionable elements 506 may include various actionable elements 506 configured to display information on the user interface 500 such as, for example, an "Add" button, a "Delete" button, a "Set Mode" button, a "Submit" button, an "Approve" button, and/or a "Deploy" button. In some examples, the actionable elements 506 may be configured to only receive input from user accounts configured as an associated role. In some examples, the view change record portion 508 may be displayed on the user interface 500 as a result of a user account selecting the "Approve" actionable element 506.

In some examples, the view change record portion 508 may be displayed on the user interface 500 as a result of a user account selecting the "Approve" button. In some examples, the view change record portion 508 may include the ticket identifier associated with the change record, the description of the change record, and/or one or more additional portions, such as, for example, a change entity summary portion 510 and/or a details portion 512. In some examples, the change entity summary portion 510 may include an identifier of the network devices associated with the change record and/or one or more actionable elements for removing an associated change from the change record. Additionally, or alternatively, the details portion 512 may include a detailed view of the changes included in the change record. In some examples, the detailed view of the changes may include programming code associated with the changes. Additionally, or alternatively, the view change record portion 508 may include one or more additional actionable elements 514, such as, for example, an approve button 514 and/or a deny button 514. In some examples, the approve button 514 may be configured such that, when actuated by a user account, the change record may be approved. Additionally, or alternatively, the deny button 514 may be configured such that, when actuated by a user account, the change record may be denied or disapproved.

FIG. 6 illustrate a schematic diagram of an example user interface 600 configured to receive data representing deployment of a configuration change from a user account and to present data associated with the configuration change to the user account. In some examples, the user interface 600 may be configured to be utilized by a user account having the administrator role.

In some examples, the user interface 600 may include a portion for displaying one or more change records 602 including one or more changes. In some examples, the portion 602 may include one or more columns for presenting information associated with the change record, such as, for example, an identification number associated with a change record, a ticket identifier associated with the change record, a state of the change record, a change record history including when the change record was last updated, a description of the change record, an identifier of a user account that created the change record, and/or a summary of the change record. In some examples, the portion for displaying the one or more change records 602 may include one or more actionable elements for selecting a change record to perform and action on the selected change record. In some examples, the user interface may include an indication of a number of change records selected 604 and/or an indication of the changes records that are selected 604.

In some examples, the user interface 600 may include one or more actionable elements 606 configured to display one or more additional portions on the user interface 600, such as, for example, a deployment change record portion 608. In some examples, the one or more actionable elements 606 may include various actionable elements 606 configured to display information on the user interface 600 such as, for example, an "Add" button, a "Delete" button, a "Set Mode" button, a "Submit" button, an "Approve" button, and/or a "Deploy" button. Additionally, or alternatively, the user interface 600 may include an actionable element 606, such as, for example, a "Freeze" button configured to transition the network into a frozen state, an unfrozen state, and/or a partially frozen state. In some examples, the "Freeze" button may be configured to only accept input from a user account configured as an administrator role. In some examples, the actionable elements 606 may be configured to only receive input from user accounts configured as an associated role. In some examples, the deployment change record portion 608 may be displayed on the user interface 600 as a result of a user account selecting the "Deploy" actionable element 606.

In some examples, the deployment change record portion 608 may be displayed on the user interface 600 as a result of a user account selecting the "Deploy" button. In some examples, the deployment change record portion 608 may include the ticket identifier associated with the change record, the identifier associated with the change record, and/or one or more additional portions, such as, for example, a network devices portion 610. Additionally, or alternatively, the deployment change record portion 608 may include one or more additional actionable elements, such as, for example, a select report template element 612 and/or a deploy configuration button 614.

In some examples, the network device portion 610 may be configured to display one or more network devices associated with the change record. In some examples, the network device portion 610 may include one or more columns for presenting information associated with the one or more network devices associated with the change record, such as, for example, a name of a network device(s), an internet protocol (IP) address(es) associated with the network device(s), an identifier (such as, for example, a serial number) associated with the network device(s), a preview of the configuration of the network device(s) (such as, for example, an indication of a number of lines of programming code associated with the change to the network device), a synchronization status of the network device(s) associated with the change record, a progression of the deployment of the change record to the network device(s), and/or an actionable element to re-synchronize the network device(s) associated with the change record.

In some examples, the select report template element 612 may be configured to receive user input from a user account configured to select a report template for deployment of the change record to the network controller. In some examples, the report templates may be default report templates and/or custom user report templates. Additionally, or alternatively, the deploy configuration button 614 may be configured such that, when actuated by a user account, the change record representing the configuration change is deployed to the network controller.

Figure 7:
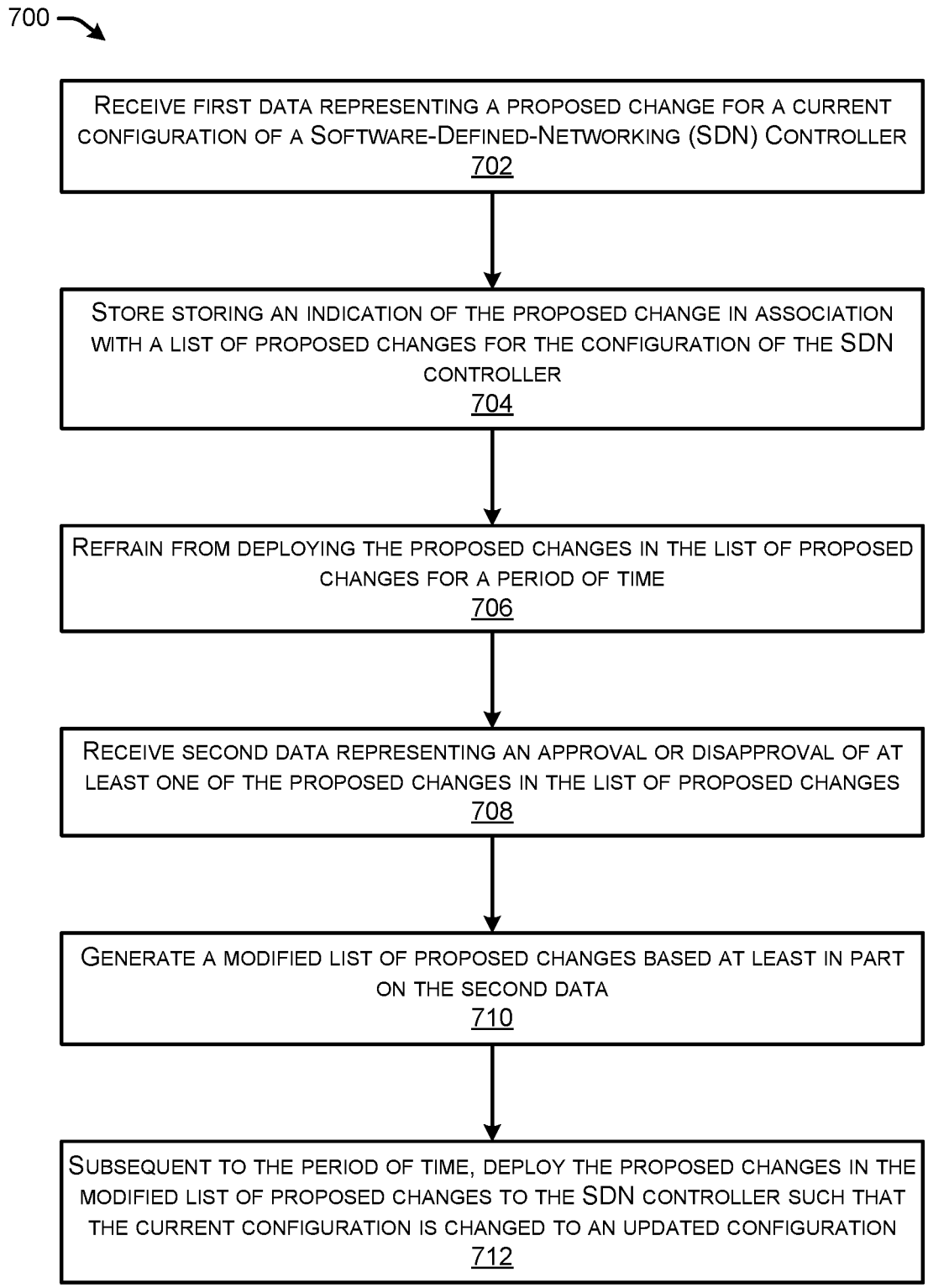
FIG. 7 illustrates a flow diagram of an example method for a configuration change service receiving a proposed configuration change for a network controller from a first user, queuing the change with additional proposed configuration changes, refraining from deploying the proposed configuration changes for a period of time, receiving approval or disapproval of the proposed changes from a second user, generating a modified list of the proposed configuration changes and deploying the modified list of proposed configuration changes subsequent to the period of time.
Figure 8:
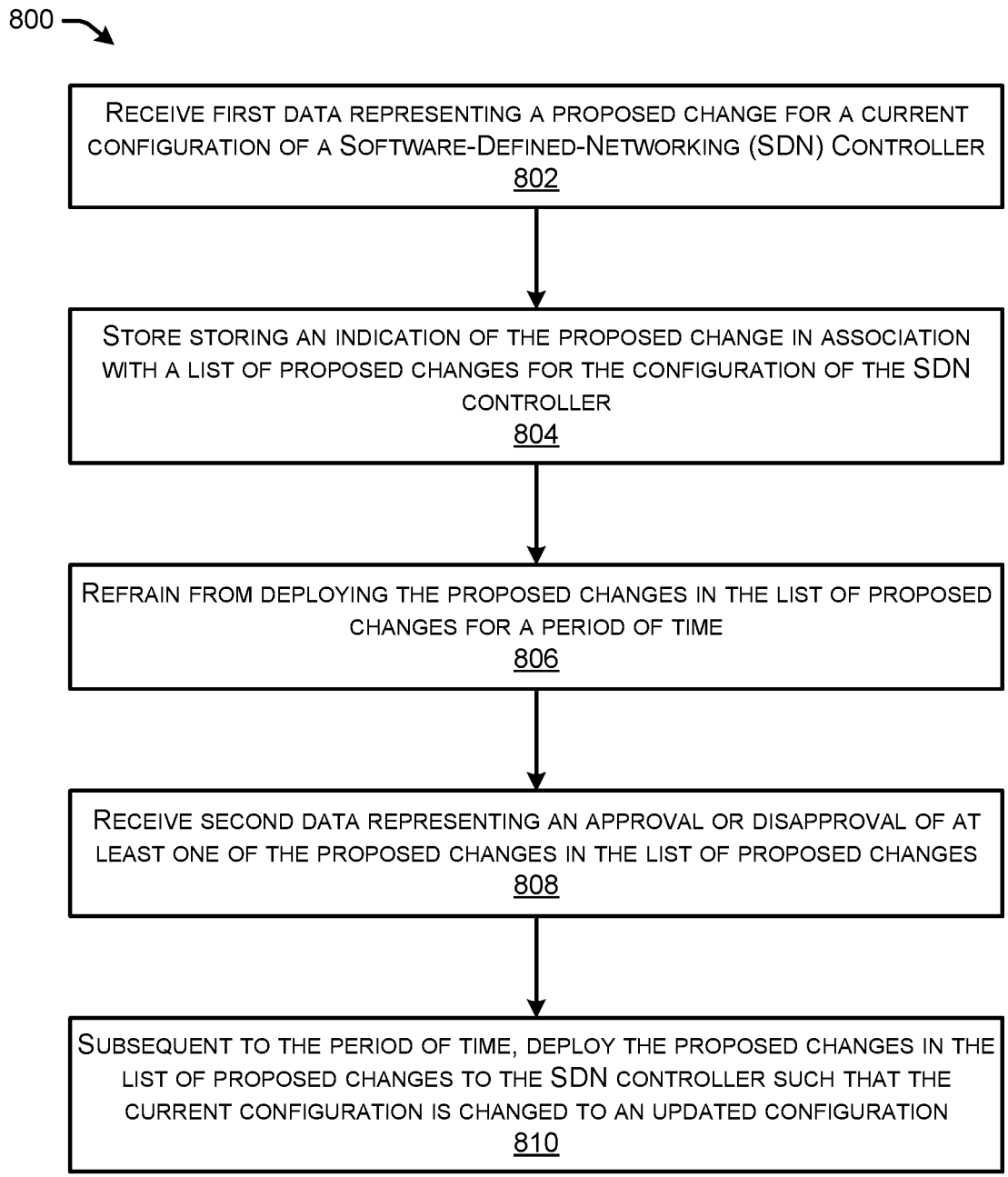
FIG. 8 illustrates a flow diagram of an example method for a configuration change service receiving a proposed configuration change for a network controller from a first user, queuing the change with additional proposed configuration changes, refraining from deploying the proposed configuration changes for a period of time, receiving approval or disapproval of the proposed changes from a second user, and deploying the modified list of proposed configuration changes subsequent to the period of time.

FIGS. 7 and 8 illustrate flow diagrams of example methods 700 and 800 and that illustrate aspects of the functions performed at least partly by the computing resource network 102 and/or the remote computing resources 202 as described in FIGS. 1 and 2. The logical operations described herein with respect to FIGS. 7 and 8 may be implemented (1) as a sequence of computer-implemented acts or program modules running on a computing system and/or (2) as interconnected machine logic circuits or circuit modules within the computing system. In some examples, the method(s) 700 and/or 800 may be performed by a system comprising one or more processors and one or more non-transitory computer-readable media storing computer-executable instructions that, when executed by the one or more processors, cause the one or more processors to perform the method(s) 700 and/or 800.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 7 and 8 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 7 illustrates a flow diagram of an example method 700 for a configuration change service 116 receiving a proposed configuration change for a network controller 106 from a first user, queuing the change with additional proposed configuration changes, refraining from deploying the proposed configuration changes to the network controller 106 for a period of time, receiving approval or disapproval of the proposed changes from a second user, generating a modified list of the proposed configuration changes and deploying the modified list of proposed configuration changes subsequent to the period of time.

At 702, a configuration change service 116 may receive user input 140 providing first data representing a proposed change 130 for a current configuration 132 of a network controller 106. In some examples, the user input 140 may be received from a first user account configured as a stager role. In some examples, the network controller 106 may be a Software-Defined-Networking (SDN) controller.

At 704, the configuration change service 116 may store an indication of the proposed change 130 in a data store associated with the configuration change service 116. In some examples, the configuration change service 116 may store the indication of the proposed change 130 in association with a list and/or a queue of proposed changes 128 for the configuration of the SDN controller.

At 706, the configuration change service 116 may refrain from deploying the proposed changes 130 in the list and/or queue of proposed changes 128 for a period of time. In some examples, the period of time may be based on a predefined schedule, where the configuration change service 116 may refrain from deploying the proposed changes 130 for a period of time until a scheduled maintenance window. Additionally, or alternatively, the period of time may correspond to a period of time between state transitions of the SDN controller 106. For example, the SDN controller 106 may be in a frozen state, such that, the SDN controller 106 is configured to not receive configuration updates until a user 134 having an administrator role transitions the SDN controller 106 into an unfrozen or partially frozen state.

At 708, the configuration change service 116 may receive user input 140 providing second data representing an approval or disapproval of at least one of the proposed changes 130 in the list and/or queue of proposed changes 128. In some examples, the user input 140 may be received from a first user account configured as an approver role.

At 710, the configuration change service 116 may generate a modified list and/or queue of proposed changes 128. In some examples, the modified list and/or queue of proposed changes 128 may be based at least in part on the second data. For example, the modified list and/or queue of proposed changes 128 may include one or more of the proposed changes 130 that received an approval. Additionally, or alternatively, the modified list and/or queue of proposed changes 128 may not include one or more of the proposed changes 130 that received a disapproval.

At 712, the configuration change service 116 may deploy the proposed changes 130 in the modified list and/or queue of proposed changes 128 such that the current configuration 132 of the SDN controller 106 is changed to an updated configuration. Additionally, or alternatively, the current configuration 132 of the SDN controller 106 may be captured and changed to the updated configuration of the SDN controller 106, and then the updated configuration may be deployed to the SDN controller 132 where the current configuration may be replaced by the updated configuration. In some examples, the proposed changes 130 in the modified list and/or queue of proposed changes 128 may be deployed by a user account configured as an administrator role. In some examples, the administrator role may deploy individual changes 130 in the modified list and/or queue of proposed changes 128. Additionally, or alternatively, the administrator role may deploy the entire modified list and/or queue of proposed changes 128.

FIG. 8 illustrates a flow diagram of an example method 800 for a configuration change service 116 receiving a proposed configuration change for a network controller 106 from a first user, queuing the change with additional proposed configuration changes, refraining from deploying the proposed configuration changes to the network controller 106 for a period of time, receiving approval or disapproval of the proposed changes from a second user, and deploying the modified list of proposed configuration changes subsequent to the period of time.

At 802, a configuration change service 116 may receive user input 140 providing first data representing a proposed change 130 for a current configuration 132 of a network controller 106. In some examples, the user input 140 may be received from a first user account configured as a stager role. In some examples, the network controller 106 may be a Software-Defined-Networking (SDN) controller.

At 804, the configuration change service 116 may store an indication of the proposed change 130 in a data store associated with the configuration change service 116. In some examples, the configuration change service 116 may store the indication of the proposed change 130 in association with a list and/or a queue of proposed changes 128 for the configuration of the SDN controller.

At 806, the configuration change service 116 may refrain from deploying the proposed changes 130 in the list and/or queue of proposed changes 128 for a period of time. In some examples, the period of time may be based on a predefined schedule, where the configuration change service 116 may refrain from deploying the proposed changes 130 for a period of time until a scheduled maintenance window. Additionally, or alternatively, the period of time may correspond to a period of time between state transitions of the SDN controller 106. For example, the SDN controller 106 may be in a frozen state, such that, the SDN controller 106 is configured to not receive configuration updates until a user 134 having an administrator role transitions the SDN controller 106 into an unfrozen or partially frozen state.

At 808, the configuration change service 116 may receive user input 140 providing second data representing an approval or disapproval of at least one of the proposed changes 130 in the list and/or queue of proposed changes 128. In some examples, the user input 140 may be received from a first user account configured as an approver role.

At 810, the configuration change service 116 may deploy the proposed changes 130 in the proposed list and/or queue of proposed changes 128 such that the current configuration 132 of the SDN controller 106 is changed to an updated configuration. Additionally, or alternatively, the current configuration 132 of the SDN controller 106 may be captured and changed to the updated configuration of the SDN controller 106, and then the updated configuration may be deployed to the SDN controller 132 where the current configuration may be replaced by the updated configuration. In some examples, the proposed changes 130 in the proposed list and/or queue of proposed changes 128 may be deployed by a user account configured as an administrator role. In some examples, the administrator role may deploy individual changes 130 in the proposed list and/or queue of proposed changes 128. Additionally, or alternatively, the administrator role may deploy the entire proposed list and/or queue of proposed changes 128.

Figure 9:
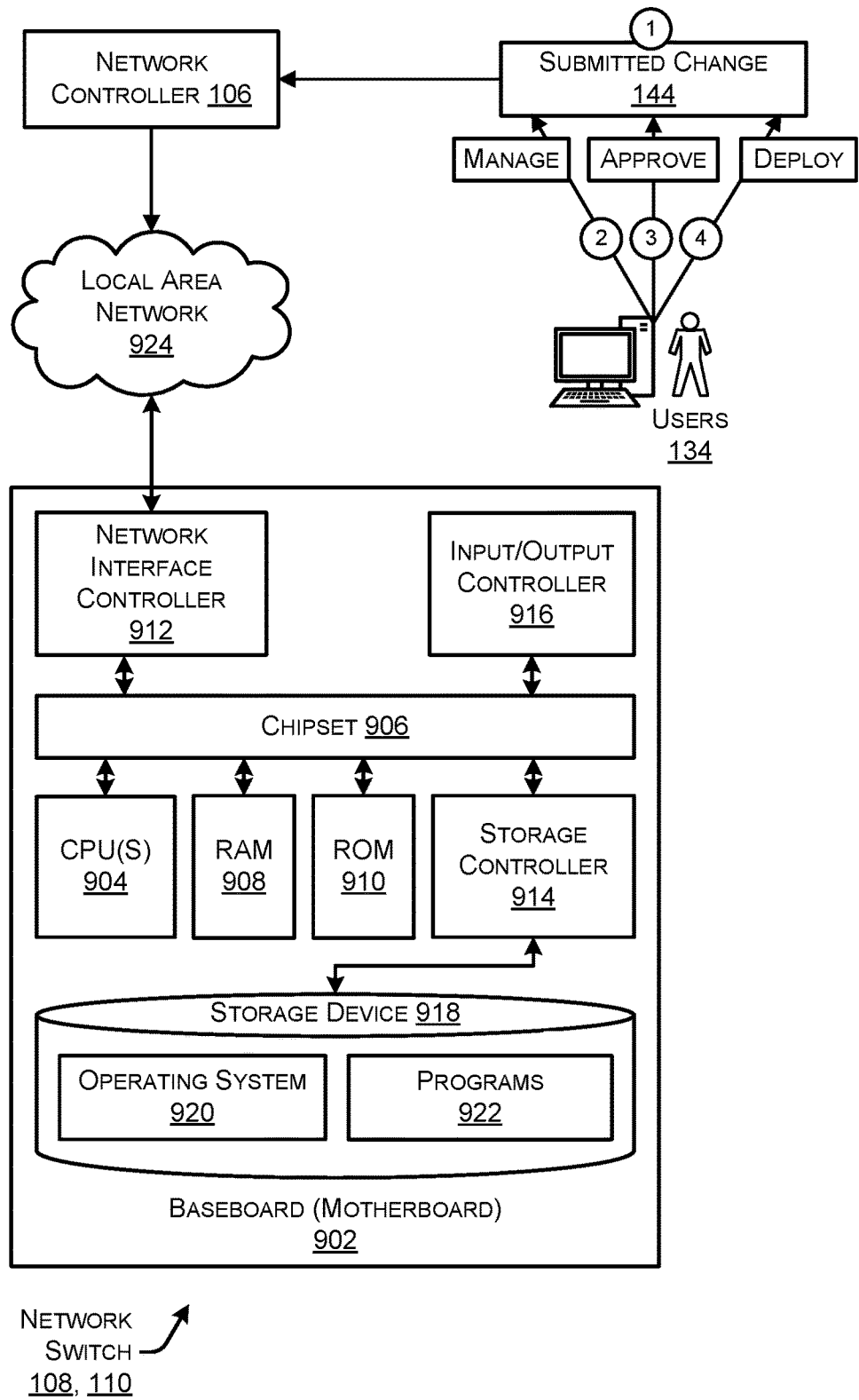
FIG. 9 is a computer architecture diagram showing an illustrative computer hardware architecture for implementing a server device that can be utilized to implement aspects of the various technologies presented herein.

FIG. 9 shows an example computer architecture for a computing device (or network switch) 108, 110 capable of executing program components for implementing the functionality described above. The computer architecture shown in FIG. 10 illustrates a conventional server computer, workstation, desktop computer, laptop, tablet, network appliance, e-reader, smartphone, or other computing device, and can be utilized to execute any of the software components presented herein. The computing device 108, 110 may, in some examples, correspond to a physical server described herein with respect to FIG. 1.

The computing device 108, 110 includes a baseboard 902, or "motherboard," which is a printed circuit board to which a multitude of components or devices can be connected by way of a system bus or other electrical communication paths. In one illustrative configuration, one or more central processing units ("CPUs") 904 operate in conjunction with a chipset 906. The CPUs 904 can be standard programmable processors that perform arithmetic and logical operations necessary for the operation of the computing device 108, 110.

The CPUs 904 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 can provide an interface to a RAM 908, used as the main memory in the computing device 108, 110. The chipset 906 can further provide an interface to a computer-readable storage medium such as a read-only memory ("ROM") 910 or non-volatile RAM ("NVRAM") for storing basic routines that help to startup the computing device 108, 110 and to transfer information between the various components and devices. The ROM 910 or NVRAM can also store other software components necessary for the operation of the computing device 108, 110 in accordance with the configurations described herein.

The computing device 108, 110 can operate in a networked environment using logical connections to remote computing devices and computer systems through a network, such as the network 924. The chipset 906 can include functionality for providing network connectivity through a NIC 912, such as a gigabit Ethernet adapter. The NIC 912 is capable of connecting the computing device 108, 110 to other computing devices over the network 924 (or 138). It should be appreciated that multiple NICs 912 can be present in the computing device 108, 110, connecting the computer to other types of networks and remote computer systems.

The computing device 108, 110 can be connected to a storage device 918 that provides non-volatile storage for the computing device 108, 110. The storage device 918 can store an operating system 920, programs 922, and data, which have been described in greater detail herein. The storage device 918 can be connected to the computing device 108, 110 through a storage controller 914 connected to the chipset 906. The storage device 918 can consist of one or more physical storage units. The storage controller 914 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 108, 110 can store data on the storage device 918 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 918 is characterized as primary or secondary storage, and the like.

For example, the computing device 108, 110 can store information to the storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 108, 110 can further read information from the storage device 918 by detecting the physical states or characteristics of one or more particular locations within the physical storage units.

In addition to the mass storage device 918 described above, the computing device 108, 110 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 108, 110. In some examples, the operations performed by the computing resource network 102, and or any components included therein, may be supported by one or more devices similar to computing device 108, 110. Stated otherwise, some or all of the operations performed by the computing resource network 102, and or any components included therein, may be performed by one or more computing device 108, 110 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 918 can store an operating system 920 utilized to control the operation of the computing device 108, 110. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 918 can store other system or application programs and data utilized by the computing device 108, 110.

In one embodiment, the storage device 918 or other computer-readable storage media is encoded with computer-executable instructions which, when loaded into the computing device 108, 110, transform the computer from a general-purpose computing system into a special-purpose computer capable of implementing the embodiments described herein. These computer-executable instructions transform the computing device 108, 110 by specifying how the CPUs 904 transition between states, as described above. According to one embodiment, the computing device 108, 110 has access to computer-readable storage media storing computer-executable instructions which, when executed by the computing device 108, 110, perform the various processes described above with regard to FIGS. 1-8. The computing device 108, 110 can also include computer-readable storage media having instructions stored thereupon for performing any of the other computer-implemented operations described herein.

The computing device 108, 110 can also include one or more input/output controllers 916 for receiving and processing input from a number of input devices, such as a keyboard, a mouse, a touchpad, a touch screen, an electronic stylus, or other type of input device. Similarly, an input/output controller 916 can provide output to a display, such as a computer monitor, a flat-panel display, a digital projector, a printer, or other type of output device. It will be appreciated that the computing device 108, 110 might not include all of the components shown in FIG. 10, can include other components that are not explicitly shown in FIG. 10, or might utilize an architecture completely different than that shown in FIG. 10.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
   one or more processors; and
   one or more non-transitory computer-readable media comprising instructions that, when executed by the one or more processors, cause the one or more processors to perform operations comprising:
      receiving first data representing a proposed change for a current configuration of a Software-Defined-Networking (SDN) Controller;
      storing an indication of the proposed change in association with a list of proposed changes for the configuration of the SDN controller;
      refraining from deploying the proposed changes in the list of proposed changes for a period of time;
      receiving second data representing an approval or disapproval of at least one of the proposed changes in the list of proposed changes;
      generating a modified list of proposed changes based at least in part on the second data; and
      subsequent to the period of time, deploying the proposed changes in the modified list of proposed changes to the SDN controller such that the current configuration is changed to an updated configuration.

2. The system of claim 1, wherein the second data indicates a disapproval of the proposed change based at least in part on at least one of a first conflict with one or more of the proposed changes and a second conflict with the current configuration of the SDN controller.

3. The system of claim 1, wherein at least one of:
   a first user account is associated with a first role having first permissions configured to submit the proposed change;
   a second user account is associated with a second role having second permissions configured to approve or disapprove the at least one of the proposed changes in the list of proposed changes; and
   a third user account is associated with a third role having third permissions configured to deploy the proposed changes.

4. The system of claim 1, wherein the refraining from deploying the proposed changes in the list of proposed changes for a period of time includes at least one of:
   refraining from deploying the proposed changes in the list of proposed changes to a network associated with the network controller;
   refraining from deploying the proposed changes in the list of proposed changes to a pre-defined portion of the network; and
   refraining from deploying the proposed changes in the list of proposed changes to a user-defined portion of the network.

5. The system of claim 1, wherein the first data includes:
   a user account identifier; and
   a justification for the proposed change; and
   the operations further comprising:
      identifying a user account based at least in part on the user account identifier;
      generating a proposed change record including the user account, the justification, and the proposed change; and
      storing an indication of the proposed change record in association with a list of proposed change records associated with the configuration of the SDN controller.

6. The system of claim 5, wherein the list of proposed change records includes at least one previous change record representing a previously proposed change for a previous configuration of the SDN controller.

7. The system of claim 1, wherein the second data includes a user account identifier, and the operations further comprising:
   identifying a user account based at least in part on the user account identifier;
   determining that the user account is associated with a role having permissions configured to approve or disapprove the proposed changes in the list of proposed changes; and
   wherein generating the modified list of proposed changes is based at least in part on determining that the user account is associated with the role.

8. The system of claim 1, wherein the first data includes a user account identifier, and the operations further comprising:
   identifying a user account based at least in part on the user account identifier;
   determining that the user account is associated with a role having permissions configured to submit the proposed change; and
   wherein storing the indication of the proposed change in association with the list of proposed changes is based at least in part on determining that the user account is associated with the role.

9. A computer-implemented method comprising:
   receiving first data representing a proposed change for a current configuration of a Software-Defined-Networking (SDN) Controller;
   storing an indication of the proposed change in association with a list of proposed changes for the configuration of the SDN controller;
   refraining from deploying the proposed changes in the list of proposed changes for a period of time;
   receiving second data representing an approval or disapproval of at least one of the proposed changes in the list of proposed changes;
   generating a modified list of proposed changes based at least in part on the second data; and
   subsequent to the period of time, deploying the proposed changes in the modified list of proposed changes to the SDN controller such that the current configuration is changed to an updated configuration.

10. The computer-implemented method of claim 9, wherein the second data indicates a disapproval of the proposed change based at least in part on at least one of a first conflict with one or more of the proposed changes and a second conflict with the current configuration of the SDN controller.

11. The computer-implemented method of claim 9, wherein at least one of:
- a first user account is associated with a first role having first permissions configured to submit the proposed change;
- a second user account is associated with a second role having second permissions configured to approve or disapprove the at least one of the proposed changes in the list of proposed changes; and
- a third user account is associated with a third role having third permissions configured to deploy the proposed changes.

12. The computer-implemented method of claim 9, wherein the refraining from deploying the proposed changes in the list of proposed changes for a period of time includes at least one of:
- refraining from deploying the proposed changes in the list of proposed changes to a network associated with the network controller;
- refraining from deploying the proposed changes in the list of proposed changes to a pre-defined portion of the network; and
- refraining from deploying the proposed changes in the list of proposed changes to a user-defined portion of the network.

13. The computer-implemented method of claim 9, wherein the first data includes:
- a user account identifier; and
- a justification for the proposed change; and
the method further comprising:
- identifying a user account based at least in part on the user account identifier;
- generating a proposed change record including the user account, the justification, and the proposed change; and
- storing an indication of the proposed change record in association with a list of proposed change records associated with the configuration of the SDN controller.

14. The computer-implemented method of claim 13, wherein the list of proposed change records includes at least one previous change record representing a previously proposed change for a previous configuration of the SDN controller.

15. The computer-implemented method of claim 9, wherein the second data includes a user account identifier, and the method further comprising:
- identifying a user account based at least in part on the user account identifier;
- determining that the user account is associated with a role having permissions configured to approve or disapprove the proposed changes in the list of proposed changes; and
- wherein generating the modified list of proposed changes is based at least in part on determining that the user account is associated with the role.

16. The computer-implemented method of claim 9, wherein the first data includes a user account identifier, and the method further comprising:
- identifying a user account based at least in part on the user account identifier;
- determining that the user account is associated with a role having permissions configured to submit the proposed change; and
- wherein storing the indication of the proposed change in association with the list of proposed changes is based at least in part on determining that the user account is associated with the role.

17. A computer-implemented method comprising:
- receiving first data representing a proposed change for a current configuration of a Software-Defined-Networking (SDN) Controller;
- storing an indication of the proposed change in association with a list of proposed changes for the configuration of the SDN controller;
- refraining from deploying the proposed changes in the list of proposed changes for a period of time;
- receiving second data representing an approval or disapproval of at least one of the proposed changes in the list of proposed changes;
- subsequent to the period of time, deploying the proposed changes in the list of proposed changes to the SDN controller such that the current configuration is changed to an updated configuration.

18. The computer-implemented method of claim 17, further comprising:
- generating a modified list of proposed changes based at least in part on the second data, and
- wherein deploying the proposed changes in the list of proposed changes comprises deploying the proposed changes in the modified list of proposed changes.

19. The computer-implemented method of claim 17, wherein at least one of:
- a first user account is associated with a first role having first permissions configured to submit the proposed change;
- a second user account is associated with a second role having second permissions configured to approve or disapprove the at least one of the proposed changes in the list of proposed changes; and
- a third user account is associated with a third role having third permissions configured to deploy the proposed changes.

20. The computer-implemented method of claim 17, wherein the first data includes:
- a user account identifier; and
- a justification for the proposed change; and
the computer-implemented method further comprising:
- identifying a user account based at least in part on the user account identifier;
- generating a proposed change record including the user account, the justification, and the proposed change; and
- storing an indication of the proposed change record in association with a list of proposed change records associated with the configuration of the SDN controller, the list of proposed change records including at least one previous change record representing a previously proposed change for a previous configuration of the SDN controller.

* * * * *